United States Patent [19]
Ablay et al.

[11] Patent Number: 5,408,683
[45] Date of Patent: Apr. 18, 1995

[54] METHOD OF ANTICIPATING A COMMUNICATION UNIT'S LOCATION IN A NETWORKED RADIO COMMUNICATIONS SYSTEM

[75] Inventors: Sewim F. Ablay, Hoffman Estates; Michael D. Sasuta, Mundelein, both of Ill.

[73] Assignee: Motorola, Inc., Schaumburg, Ill.

[21] Appl. No.: 732,539

[22] Filed: Jul. 18, 1991

[51] Int. Cl.6 ............................................. H04Q 7/22
[52] U.S. Cl. .................................. 455/33.1; 459/54.1; 459/56.1; 379/59
[58] Field of Search ................... 455/33.1, 33.2, 33.3, 455/33.4, 54.1, 54.2, 56.1; 379/59, 60

[56] References Cited

U.S. PATENT DOCUMENTS

| | | | |
|---|---|---|---|
| 4,481,670 | 11/1984 | Freeburg | 455/33 |
| 4,519,068 | 5/1985 | Krebs et al. | 370/82 |
| 4,670,905 | 6/1987 | Sandvos et al. | 455/33 |
| 4,670,906 | 6/1987 | Thro | 455/56 |
| 4,794,635 | 12/1988 | Hess | 379/60 |
| 4,833,701 | 5/1989 | Comroe et al. | 379/60 |
| 4,876,738 | 10/1989 | Seby | 455/33 |
| 5,067,147 | 11/1991 | Lee | 455/33.3 X |
| 5,095,531 | 3/1992 | Ito | 455/56.1 |
| 5,179,374 | 1/1993 | Winger | 455/33.1 X |
| 5,189,734 | 2/1993 | Bailey et al. | 455/56.1 X |
| 5,214,789 | 5/1993 | George | 455/33.2 |

*Primary Examiner*—Edward F. Urban
*Attorney, Agent, or Firm*—James A. Coffing; Joseph P. Krause

[57] ABSTRACT

A method of tracking subscribers (201, 203) in a networked radio communications system (100, 200). The subscribers (201,203) are able to roam among a plurality of coverage areas (104–106) which are serviced by a plurality of transmitters (107–109). The transmitters (107–109) are coupled to a central processor (CP, 110), which accesses a memory device (112) for storing subscriber records and site records. Subscriber records include location information for each of the subscribers, while the site records include a logical representation of geographical relationships between the coverage areas. The method relies on the subscriber to send an inbound message (330) which includes its current location. Further, the CP (110) records a message time for the inbound message, producing a timestamped location, then updates (405) a corresponding portion of the subscriber record with the timestamped location.

12 Claims, 5 Drawing Sheets

FIG.1B —PRIOR ART—

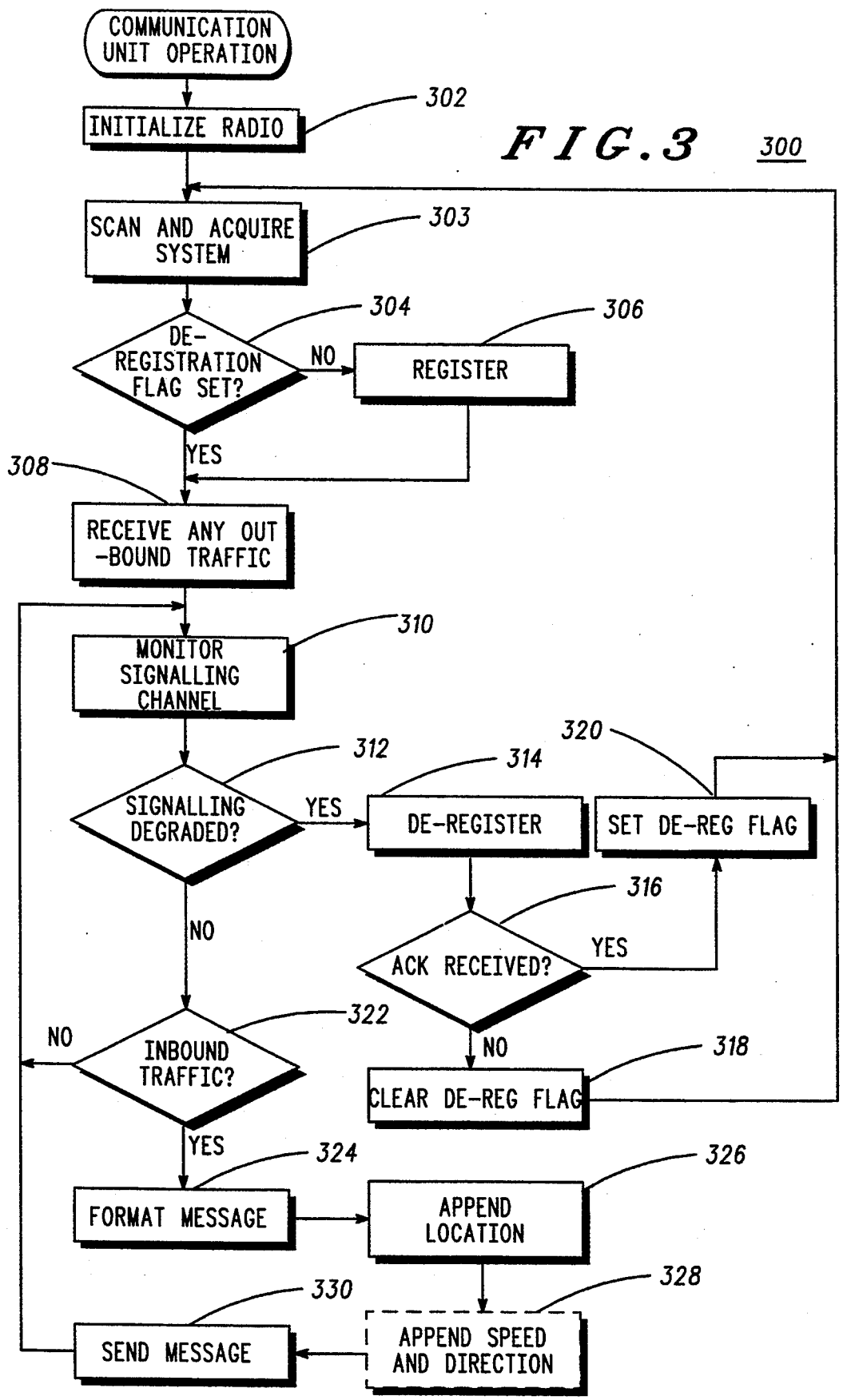

METHOD OF ANTICIPATING A COMMUNICATION UNIT'S LOCATION IN A NETWORKED RADIO COMMUNICATIONS SYSTEM

FIELD OF THE INVENTION

The present invention relates generally to networked radio communications systems, and more particularly to a method of tracking subscribers which may be roaming among coverage areas of such a system.

BACKGROUND OF THE INVENTION

Trunked communications systems are well known in the art. Similarly, networking of such systems for expanded coverage, hereinafter referred to as trunked communications networks, is known. Generally, trunked systems share limited communication resources, which are typically radio frequency (RF) channels, amongst a relatively large number of communication units, or subscribers. For purposes of this disclosure, a subscriber shall refer to any mobile radio, portable radio, console, or any other similar communication device known in the art. After registering onto a trunked system, a subscriber is able to communicate with any other subscriber via a selected voice, or data, channel which is selected by the repeater, or transmitter site. Communication between the transmitter site and subscriber is typically done using a selected RF channel, commonly known as a control channel. Control channel traffic is comprised of inbound signalling words (ISW) and outbound signalling words (OSW). A subscriber issues an ISW to request use, or relinquishment, of a voice channel, while the repeater uses an OSW to respond to such requests. Inbound traffic is comprised of subscriber ISW's as well as voice, or other data, in either digital or analog form, sent by a subscriber initiating a communication. Outbound traffic is comprised of repeater OSW's as well as data, as described hereinabove, to be delivered to a target subscriber. In a trunked communications network, a central processor, or hub, routes inbound and outbound traffic among trunked systems, for distribution to/from the respective subscribers within their coverage areas.

As part of the registration process, the registered subscriber is assigned an identification code (ID) by the system. Subsequent call requests by the registered subscriber include this ID as part of the inbound message, which is transmitted to the repeater. The inbound message is then forwarded to the hub, typically via a wireline, such as a packet data network, or PDN. When not participating in a call, each subscriber monitors the control channel. When the transmitter site receives a call request ISW from a source subscriber (e.g., to initiate a communication with a target subscriber, or subscribers), the site issues a channel grant OSW to the source and all target subscribers, which includes the frequency of the available voice channel, if such a channel is available. Upon receipt of the channel grant, both the initiating subscriber and the target subscribers leave the control channel frequency and move to the assigned voice channel frequency to participate in the call. If, however, all voice channels are in use, the site returns a busy OSW and the source subscriber must wait until a channel becomes available. Call requests, channel grants, and busies are only a select few of the many types of inbound and outbound traffic which characterizes a modern trunked communications system, and network of systems.

The RF range of a single-site trunked communications system is typically on the order of 20 miles from the transmitter (i.e., a system RF coverage diameter of 40 miles). Within this area, it is assumed that the mobile and portable subscribers are allowed to move about, or roam, at will. If a subscriber should roam outside the RF coverage area of the trunked system, the subscriber would be unable to acquire the control channel from the transmitter site, for that system, rendering communication with (to/from) that subscriber impossible. Accordingly, the subscriber goes into a scan mode to acquire a control channel from another site. Therefore, in a multiple-site trunked communications network, such as the one shown in FIG. 1A and later described, the subscribers are capable of roaming between a plurality of RF coverage areas in the network, substantially without loss of communication capability.

At least one well known method exists to provide trunked communications in a networked configuration. In such a network, subscribers have nationwide roaming capability through use of selected trunked systems which are equipped with local computers that communicate with a national hub computer. At each selected trunked system, several IDs are reserved as "roaming IDs" to be temporarily assigned to roaming subscribers. When a subscriber determines that it has roamed into a new trunked system, it requests a roaming ID from the local host system. The roaming ID assignment is transmitted to the hub computer so that appropriate calls may be forwarded to/from the roaming subscriber. The roaming subscriber can operate under the assigned roaming ID until it roams out of the range of the current system and into yet another trunked system. In this way, the subscriber is allowed to roam from system to system.

FIG. 1A shows a graphical representation of a simple three-site trunked communications network. Such a network may be comprised of three coverage areas 104-106, which are served by hosts, or transmitter sites 107-109, respectively. These transmitter sites are coupled to a central processor (CP) 110, via wirelines 114 for example. CP 110 has coupled to it a memory device 112 which is typically used for storing network and subscriber information, which is later described. When a subscriber, for example subscriber 102, desires to initiate or receive calls through the trunked communications network, a roaming ID assignment is required for that subscriber. Such an ID allows the hub to keep track of that subscriber and determine an appropriate transmitter site to which outbound messages should be delivered.

FIG. 1B shows a simplified ID-assignment table for the subscriber 102 shown in FIG. 1A, which table is known in the art. Such a table will be used to illustrate how the ID is tracked by the host sites as the subscriber roams across their respective coverage boundaries. At a time T1, the subscriber enters coverage area (CA) 104, registers with transmitter site 107, and is assigned an identification code (ID) of 5, for example. After traveling through CA 104, at a time T2, subscriber 102 de-registers with transmitter site 107, and relinquishes his roaming ID so that it can be re-issued to another subscribers at a later time. Upon entering into CA 105, and explicitly registering with site 108, subscriber 102 is assigned ID 3, for example. This temporary, roaming ID is used until a time T3, when subscriber 102' enters into CA 106. At that time, the de-registration-registration sequence occurs again, whereby ID 3 is relinquished to the system, and a new ID 6, for example, is issued by site 109 to subscriber 102' for purposes of communicating within CA 106. At a later point in time, subscriber 102' may turn around and re-enter CA 105. By doing so, the unit must, at a time T4, de-register with site 109 and re-register with site 108. Though subscriber 102 has previously been in coverage area 105, its previous ID (e.g., 3) is no longer available for its use. Accordingly, a new ID assignment is necessitated and site 108 issues ID number 9 to subscriber 102" for purposes of communicating within coverage area 105.

The aforementioned scenario, though exemplified in a simple, three-site system, serves to show the tremendous amount of control channel traffic required by a system which re-assigns ID numbers, as shown in the known systems of the prior art. The time-consuming exercise of first de-registering (unless not yet registered) and subsequently re-registering upon crossing coverage area boundaries, represents an undesirable ratio of control channel traffic to that of actual communication (e.g., voice, data) between subscribers. Furthermore, in the case where a subscriber rarely initiates or receives messages, the task of repeatedly de-registering and re-registering while roaming throughout the system becomes a frivolous, unnecessary exercise. From the perspective of the service provider, control channel traffic simply amounts to non-billable, administrative overhead.

Accordingly, there exists a need for a trunked communications network which does not rely on explicit registration and de-registration to keep track of roaming subscribers within that network. Further, it is desired to have a system which uses subscriber-specific parameters to more efficiently allocate communication resources to those subscribers.

SUMMARY OF THE INVENTION

The present invention encompasses a method of tracking subscribers in a networked radio communications system. The subscribers are able to roam among a plurality of coverage areas which are serviced by a plurality of transmitters. The transmitters are coupled to a central processor (CP), which accesses a memory device for storing subscriber records and site records. The subscriber record includes location information for each of the subscribers, while the site record includes a logical representation of geographical relationships between the plurality of coverage areas. The method relies on the subscriber generating an inbound message, and appending to it a current location within a current coverage area. Further, the CP records a message time for the inbound message, producing a timestamped location, then updates at least a portion of the subscriber record with said timestamped location.

BRIEF DESCRIPTION OF THE DRAWINGS

FIG. 1B is a portion of a registration time-sequence indicating possible ID assignments for the communications system of FIG. 1A, in accordance with the prior art.

FIG. 3 is a flow diagram depicting the operation of a subscriber, in accordance with one embodiment of the present invention.

DETAILED DESCRIPTION OF A PREFERRED EMBODIMENT

In a preferred embodiment of the present invention, a principal benefit realized is the reduction of undesired control channel traffic on a trunked communications network. This is accomplished by using real-time system data, including subscriber location, speed, and direction, as well as geographical coverage site data, to predict where subsequent outbound messages should be delivered to roaming subscribers. Such a system avoids the requirement for each subscriber to explicitly register with a system whenever the boundaries for that system are crossed.

Figure 1A:
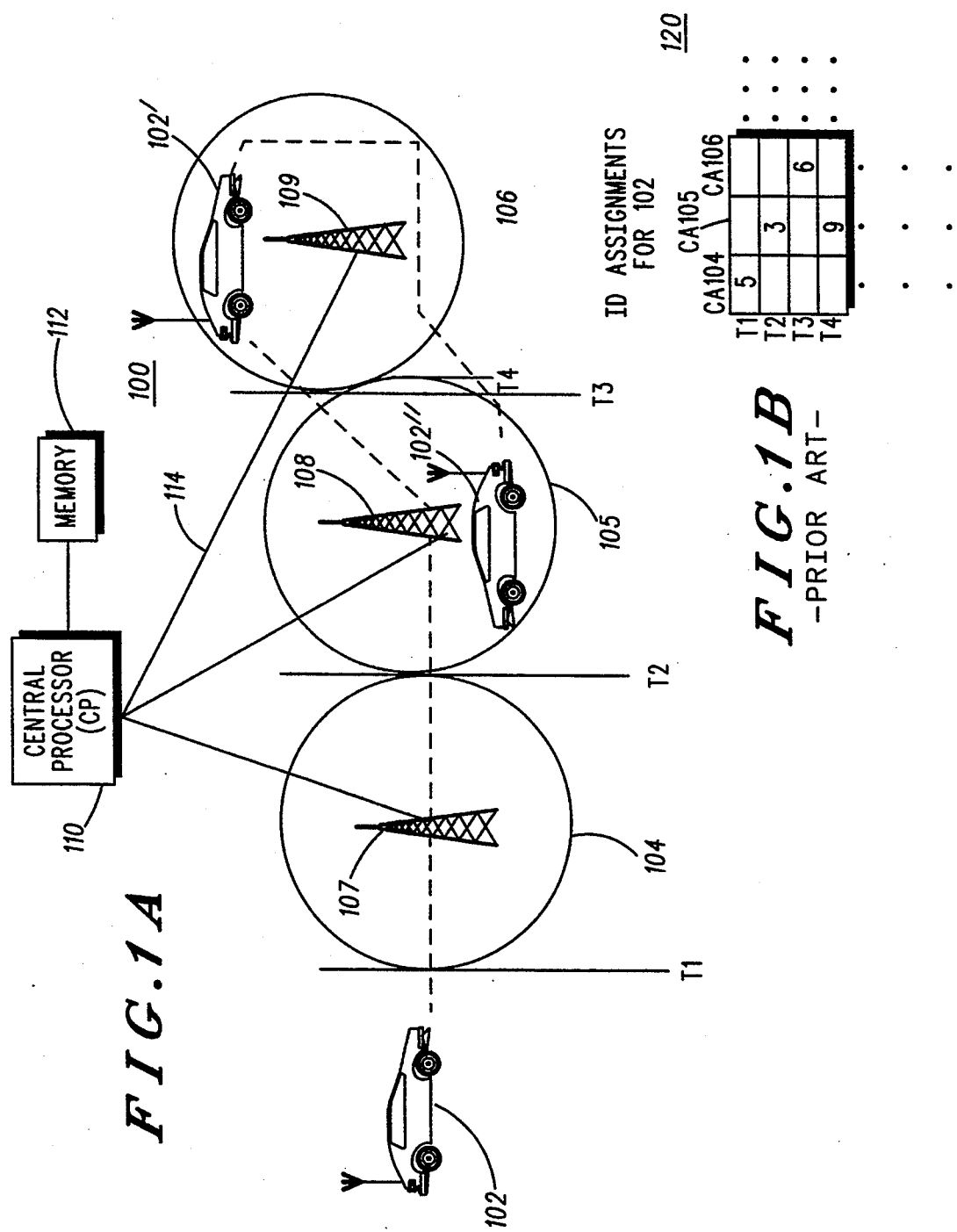
FIG. 1A is a simplified graphical representation of a typical networked communications system which may employ the present invention.

An important feature of the trunked communication network employing the present invention includes the central processor's knowledge of the geographical relationships among the transmitter sites in the network. That is, the CP 110 stores a logical representation of a geographical map indicating those sites that are adjacent to each other. Table 1 shows such a logical representation, which may exist in a data array or other known data structure, and resides in a memory device, such as memory device 112 coupled to CP 110 in FIG. 1A.

TABLE 1

|  | Site (CA) # | Adjacent Sites | Alternate |
|---|---|---|---|
| Sites | | | |
|  | 1 | 2, 4, 6 | 3, 3A, 5, 7 |
|  | 2 | 3, 3A, 4, 1 | 5, 6, 7 |
|  | 3 | 3A, 2, 4 | 1, 5, 7 |
|  | 3A | 3, 2 | 4, 1 |
|  | 4 | 1, 2, 3, 5, 7 | 3A, 6, 8 |
|  | 5 | 8, 4, 7 | 1, 2, 3, 3A, 6 |
|  | 6 | 1, 7 | 2, 4, 5, 8 |
|  | 7 | 4, 5, 6, 8 | 1, 2, 3, 3A |
|  | 8 | 5, 7 | 3, 3A, 4, 6 |

Figure 2:
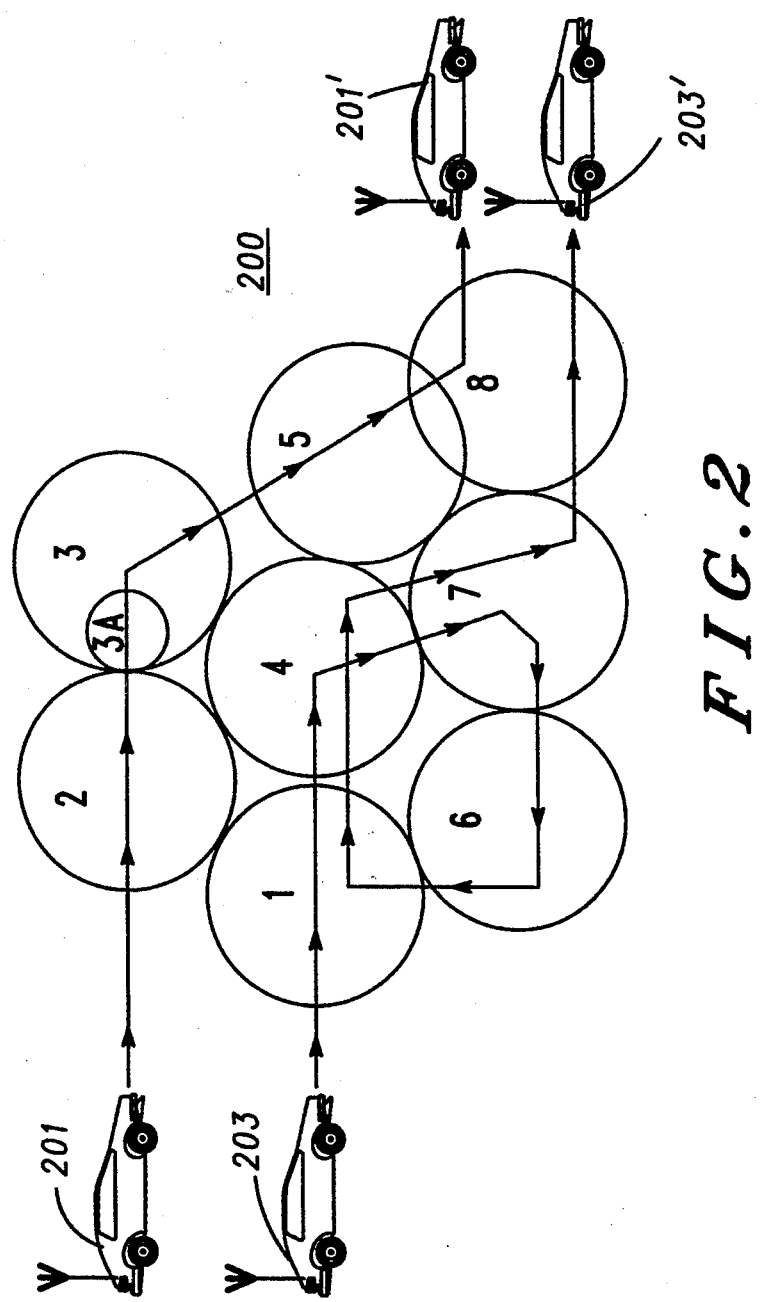
FIG. 2 is a graphical representation of a radio communications system depicting two possible paths for a subscriber roaming within that system.

The entries of Table 1 correspond to the trunked radio communications network 200 shown in FIG. 2. FIG. 2 shows coverage areas 1–8, which will be used to describe the advantages afforded by a preferred embodiment of the present invention. Referring to FIG. 2, there is shown two subscribers 201, and 203, which move through the geographical coverage areas of systems 1–8. Considering the path taken by subscriber 201, Table 2 shows how the subscriber record data, stored at the CP, changes as the subscriber travels through coverage areas 2, 3, 5 and 8.

TABLE 2

| Unit ID | Site Reg | Reg Time | Current Loc | Latest Trend | De-Reg |
|---|---|---|---|---|---|
| 509-00B | CA-2 | 0004 | 42/08/54 N 87/52/27 W | 55 + 090 | 0 |
| 509-00B | CA-2 | 0113 | 42/08/54 N 86/22/29 W | 55 + 090 | 1 |
| 509-00B | CA-3 | 0245 | 39/50/51 N 85/00/00 W | 55 + 135 | 0 |
| 509-00B | CA-3 | 0308 | 38/10/20 N 84/00/00 W | 55 + 135 | 1 |
| 509-00B | CA-5 | 0349 | 37/05/21 N 83/49/25 W | 58 + 135 | 0 |
| 509-00B | CA-8 | 0415 | 37/02/15 N | 25 + 090 | 0 |

TABLE 2-continued

| Unit ID | Site Reg | Reg Time | Current Loc | Latest Trend | De-Reg |
|---------|----------|----------|-------------|--------------|--------|
|         |          |          | 83/10/11 W  |              |        |

The contents of the subscriber record are the units permanent ID, the last known registration site, the time at which the unit last registered, its last known location (given in units of latitude and longitude), trend data (speed and direction), and a de-registration flag. It should be noted that, in an alternate embodiment, several times and locations may be stored at the CP to enable the CP to extrapolate a next destination for the subscriber, using an estimated directional vector, later described. It is also contemplated that the subscriber may determine an actual directional vector using either historical location data, or current speed and direction information, also later described. It is still further contemplated that the subscriber may be capable of sensing a change in his directional vector, and selectively relaying this new directional vector to the CP (e.g., when the change exceeds a predetermined threshold). This information may then be used to update the subscriber record at the CP, assuring that subsequent probable routing sites are determined using accurate information.

Referring again to Table 2, the de-registration flag stored at the CP, like a similar flag stored at the subscriber, is a binary value which indicates the current registration status for the subscriber (i.e. flag=0 indicates the subscriber is currently registered on a site; flag=1 indicates the subscriber was successfully de-registered from the last site). The local de-registration flag, internal to each subscriber, is used to determine subscriber operating procedures, as later described. The exemplary path traveled by subscriber 201, and its corresponding timestamped data entries in the memory at the fixed end (e.g., CP 110), help to describe one advantage of the present invention, while the path traveled by subscriber 203 (through sites 1-4-7-6-1-4-7-8) illustrates a second benefit of such an embodiment, both showing how unnecessary control channel traffic is dramatically reduced. In particular, when subscriber 203 re-enters site 1, it simply uses it's permanent unit ID when first initiating a communication from that coverage area. Similarly, when subscriber 203 re-enters sites 4 and 7, there is no need to explicitly re-register with those sites. That is, since the system is able to determine, which process is later described, where outbound messages should be delivered to a particular subscriber (with some degree of statistical certainty), there is no longer a need for a subscriber to explicitly register with the transmitter site whenever crossing coverage area boundaries. Registration will be required only when communication is initiated by the subscriber, a technique hereinafter referred to as implicit registration. On the other hand, when no communication is initiated by the subscriber when first passing through, explicit registration is then required as part of the first such communication from that subscriber.

FIG. 3 shows a simplified flow diagram of the subscriber operation 300. The radio is initialized at 302 before attempting to scan and acquire at 303 a system. That is, a predetermined list of control channel frequencies are scanned until an acceptable signal is acquired. Once acquired, a decision is reached at 304 where it is determined whether or not the subscriber was previously successfully de-registered. This is done using the internal de-registration flag in the subscriber. If the flag is set (i.e., the subscriber was successfully de-registered on the last system), the subscriber need not re-register. If the flag is not set the subscriber registers at 306 in known fashion, before preparing to receive at 308 any outbound traffic which may be delivered from the transmitter site. The signalling, or control, channel is then monitored at 310, where it is determined at 312 whether or not the received signalling has degraded. If the signalling has not been degraded, as determined, for example, by a standard received signal strength indicator (RSSI), a decision is reached at 322 where it is determined whether or not the subscriber has any pending inbound traffic. If not, the routine returns to monitoring at 310 the signalling channel. If inbound traffic is to be sent, the message is formatted at 324, before appending at 326 the current location of the subscriber. This capability presumes, of course, that the subscriber is capable of establishing its longitudinal and latitudinal coordinates. These coordinates are then used at the CP to determine, via calculations later described, where subsequent outbound messages for that particular subscriber should be delivered. Such a location-establishing capability may be Loran-C or other such technique which is known in the art.

At this point, the vehicular speed and direction, which may be determined by any of several known methods, is optionally appended at 328 to the message before sending at 330 the message to the transmitter site. This option is employed only if the subscriber is capable of determining trend data (i.e., current speed and direction, or directional vector). In an alternate embodiment, the directional vectors may be established at predetermined intervals, and stored in memory at the subscriber. These stored vectors are then compared at the subscriber to determine whether or not the subscriber has undergone a significant directional change (i.e., enough to jeopardize the validity of calculations made at the fixed end). Further, the location update would not be sent to the CP until a significant directional change is detected. It should also be noted that the term "append", as used herein, does not necessarily imply that the information appears last in the message datastream, but only that it is added somewhere within that stream. Additionally, the CP (e.g. a computer-based communications processor) may be capable of extrapolating subsequent probable locations for the subscriber. That is, given the time of receipt for the inbound message and the last registration time and trend of the vehicle (i.e., defining a directional vector), the CP would be able to anticipate where the subscriber may be when an outbound message is to be delivered. In the absence of such capabilities, the CP may determine subscriber trends, for example, by storing successive timestamped locations and calculating an estimated directional vector which may be used to determine probable subsequent locations.

Returning to decision 312, if the signalling has degraded, the subscriber requests de-registration from the current system at 314, via an ISW. A decision is then reached at 316, where it is determined whether or not acknowledgement, from the CP, that the de-registration request has been received by the CP. This ensures that communication with the transmitter site has not degraded to an extent to prevent the ISW, or response OSW, to arrive (i.e., with sufficient signal strength so as to be detected) at the CP and subscriber, respectively. If acknowledgement of the de-registration request is not received (meaning that it is probably out of the RF coverage area), the subscriber clears at 318 its internal de-registration flag. The routine then returns to the scan and acquire operation at 303. If acknowledgement from the transmitter site is received by the subscriber, the subscriber then sets at 320 the internal de-registration flag, and the routine returns to the scan and acquire operation at 303.

Figure 4A:
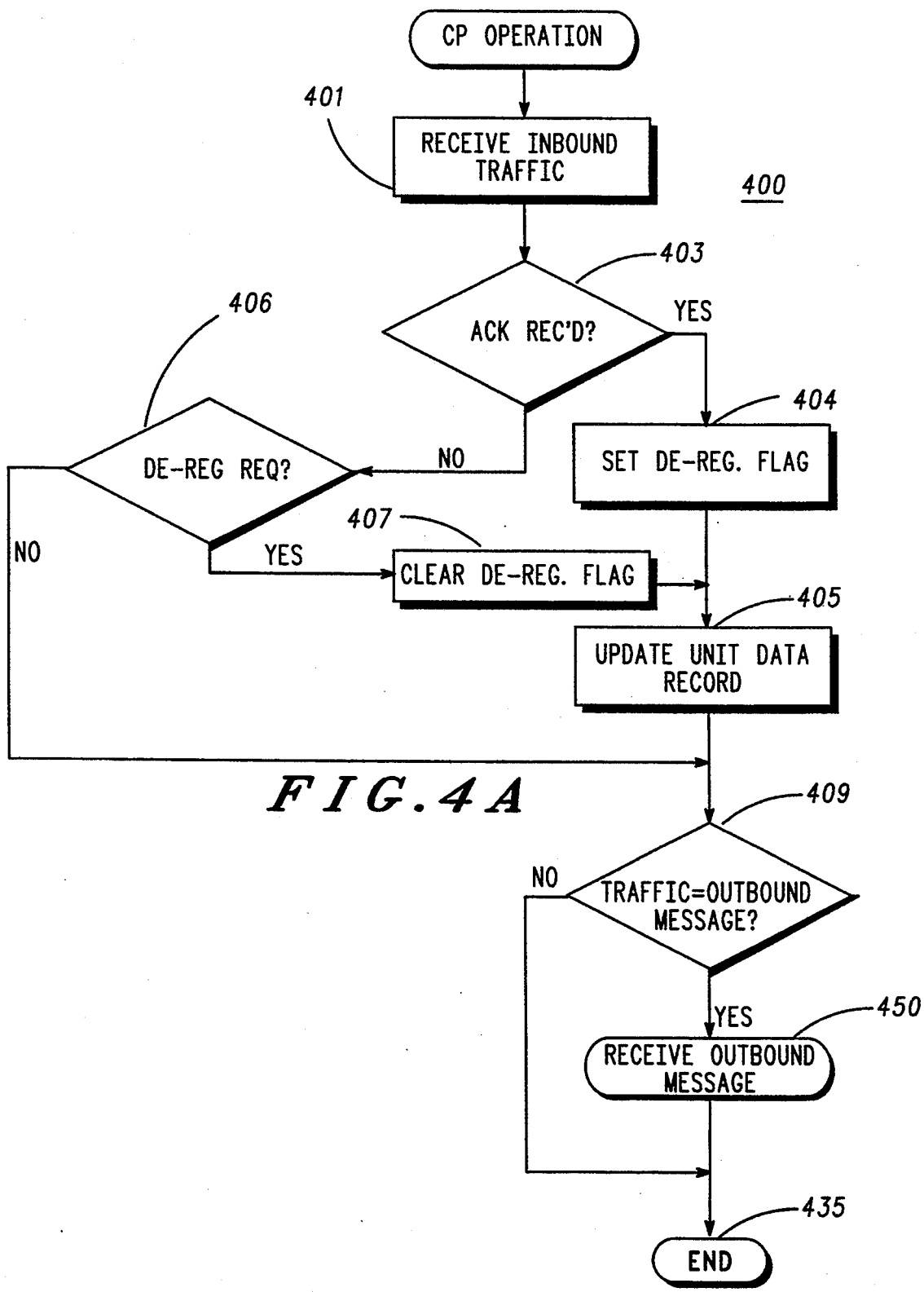
FIG. 4 is a flow diagram depicting the operation of a central processor, or hub, in accordance with one embodiment of the present invention.

FIG. 4A shows a simplified flow diagram 400 of the CP operation, in accordance with a preferred embodiment of the present invention. The CP receives at 401, from one of the transmitter sites, inbound traffic (ISW) which originates from a subscriber in the coverage area for that site. A decision is then reached at 403, which determines whether or not the ISW includes an acknowledgement of receipt of an earlier OSW. If the traffic does not include an acknowledgement, another decision is reached at 406, which determines whether or not the inbound traffic includes a request to de-register the subscriber. If the traffic includes such a request, the de-registration flag is cleared at 407, and the subscriber data record for that subscriber is updated at 405 by the CP. In the preferred embodiment, this update includes a timestamped location (comprising the location sent by the subscriber, and a message time determined either by the message receipt time at the CP, or the message origination time from the subscriber, depending on the capabilities of the system). If the traffic does not include a request to de-register, a decision is reached at 409, which function is later described. Returning back to decision 403, if acknowledgement to an earlier OSW has been received by the CP, the CP sets its de-registration flag at 404, and updates at 405 the data record for that subscriber. A decision is then reached at 409 which determines whether or not the traffic is an outbound message. If the traffic includes outbound message data, the CP prepares to receive at 450 the outbound message, and the routine is exited at 435. If the traffic does not include any outbound messages, the routine is simply exited at 435.

Figure 4B:
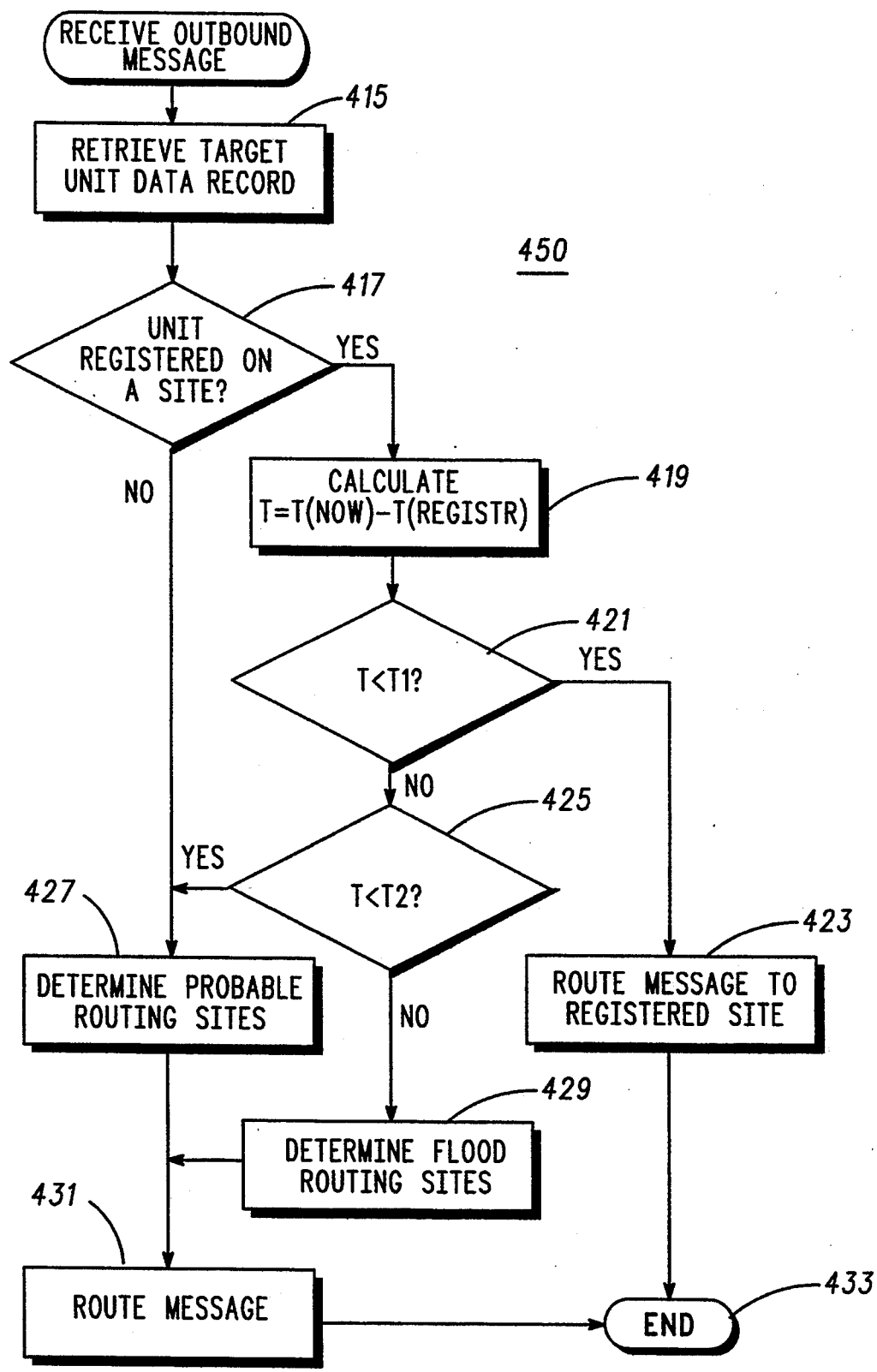

FIG. 4B shows a simplified flow diagram 450 of the CP, detailing outbound message receipt operation, in accordance with a preferred embodiment of the present invention. Once an outbound message is received, the CP retrieves at 415 the unit data record (i.e., Table 2 entry) for the target subscriber. A decision is then reached at 417, for example using the de-registration flag, where it is determined whether or not that subscriber is registered on any of the sites in the network. If not, the CP determines at 427 the probable routing sites based, at least in part, on the location of the subscriber when it was last registered. This may be accomplished by using the most recent location and trend data for the unit (Table 2), in combination with geographical data (Table 1), to calculate the most likely coverage areas that the unit may be currently located in. The message is then routed to the appropriate sites at 431, before the routine is exited at 433.

Returning to decision 417, if the unit is registered on a particular site, the CP calculates at 419 an elapsed time between the time the message was received and the time that the target subscriber was last registered, based on the timestamped site registration in the unit record (i.e., column 3). The CP is able to calculate, knowing the geographical area covered by each of the sites in the network, a set of time parameters, hereinafter designated T1, and T2. T1 refers to the time it would take the subscriber to travel beyond the coverage area of its current site. Such a scheme requires the knowledge of the current location of that unit both geographically (latitude and longitude) and also the site ID. The site ID is used to cross reference into another portion of the CP memory 112 which describes the geographic parameters for that site (i.e., latitude and longitude, square area, etc.). The last known location of the target subscriber enables the CP to determine, using either actual trend data or calculated trend data (i.e., directional vectors), a probable subsequent location for that subscriber. T2 refers to that period of time for a unit to be within coverage range of the sites which are adjacent to the last registered site, given its last known location and, optionally, its last known speed and direction.

Returning to FIG. 4B, after calculating at 419 the elapsed time, a decision is reached at 421 which determines whether or not the elapsed time is less than T1. If so, the message is routed at 423 to the last-registered site before the routine is exited at 433. It should be noted that, in an alternate embodiment, the message may be routed to adjacent sites (see Table 1). This may be done in the case where the de-registration for that site was not successfully received at the fixed end (CP). If the elapsed time is not less than T1, a decision is reached at 425 to determine whether or not the elapsed time is less than T2. If so (i.e, the target subscriber is not within the last-registered site, but is within an adjacent site), the probable routing sites are determined at 427 (i.e., using the list of adjacent sites in Table 1). The message is then routed at 431, and the routine is exited at 433. If the elapsed time is not less than T2 (i.e., the subscriber has wandered beyond even sites adjacent to its last-registered site), flood routing sites are determined at 429. Flood routing sites are determined by the alternate site listing (refer to Table 1) for the last-registered site. The message is then routed at 431, and the routine is exited at 433.

The present invention offers a significant advantage in dramatically reducing control channel traffic by minimizing the frequency of required subscriber registration. It is the availability of this unused control resource which allows for increased traffic on the communication resources, for example voice channels on a trunked radio communications system.

What is claimed is:

1. In a networked radio communications system that includes a plurality of subscribers and a plurality of transmitter sites that service a plurality of coverage areas, each subscriber being able to roam between the plurality of coverage areas, each of the transmitter sites providing at least one of a plurality of transmitters that are each coupled to a central processor which accesses a memory device holding subscriber records and site records, the subscriber records including, inter alia, a location for each of the subscribers, the site records including a logical representation of geographical relationships among the plurality of coverage areas, a method of delivering an outbound message using reduced control channel signaling, the method comprising the steps of:

at the subscriber,
  determining a current location, within a current coverage area;
  sending an inbound message which includes at least said current location;

at the central processor, recording said current location and a message time for said inbound message to produce a timestamped location;

updating at least a portion of a corresponding subscriber record with said timestamped location;

determining, based on said corresponding subscriber record and a site record for said current coverage area, at least one coverage area in which the subscriber is most likely located, to produce at least one anticipated coverage area;

calculating a difference between the present time and a previous registration time, to produce an elapsed time;

determining, based in part on said timestamped location, a probable maximum time in which the subscriber would be outside at least said current coverage area;

comparing said probable maximum time with said elapsed time and delivering, responsive to the step of comparing, said outbound message to the subscriber.

2. In a networked radio communications system that includes a plurality of subscribers and a plurality of transmitter sites which service a plurality of coverage areas, each subscriber being able to roam between the plurality of coverage areas, each of the transmitter sites providing at least one of a plurality of transmitters that are each coupled to a central processor which accesses a memory device holding subscriber records and site records, the subscriber records including, inter alia, a location for each of the subscribers, the site records including a logical representation of geographical relationships among the plurality of coverage areas, a method of identifying at least one of the plurality of transmitter sites for delivery of an outbound message to a subscriber, the method comprising the steps of:

at the subscriber, determining a current location, within a current coverage area;

sending an inbound message which at least includes said current location; and appending to said inbound message a current speed and direction of the subscriber, to produce a directional vector;

at the central processor, recording said current location and a message time for said inbound message to produce a timestamped location;

updating at least a portion of a corresponding subscriber record with said timestamped location;

receiving the outbound message for delivery to the subscriber;

determining, based on said timestamped location and a site record for said current coverage area, at least one coverage area in which the subscriber is most likely located, to produce at least one anticipated coverage area;

calculating a difference between the present time and a previous registration time, to produce an elapsed time;

determining, based in part on said timestamped location and said directional vector, a probable maximum time in which the subscriber would be outside at least said current coverage area;

comparing said probable maximum time with said elapsed time and delivering, responsive to the step of comparing, said outbound message to the subscriber.

3. A method in accordance with claim 2, further comprising the step of, at the central processor, routing said outbound message to at least one transmitter serving said at least one transmitter site.

4. In a networked radio communications system that includes a plurality of subscribers and a plurality of transmitter sites which service a plurality of coverage areas, each subscriber being able to roam between the plurality of coverage areas, each of the transmitter sites providing at least one of a plurality of transmitters that are each coupled to a central processor which accesses a memory device holding subscriber records and site records, the subscriber records including, inter alia, a location for each of the subscribers, the site records including a logical representation of geographical relationships among the plurality of coverage areas, a method of identifying at least one of the plurality of transmitter sites for delivery of an outbound message to a subscriber, the method comprising the steps of:

at the subscriber, determining a current location, within a current coverage area;

sending, at an origination time, inbound messages which at least include said current location at said origination time; and appending to said inbound message a current speed and direction of the subscriber, to produce an actual directional vector;

at the central processor, recording said current location and a message time for said inbound messages to produce at least one timestamped location;

updating at least a portion of a corresponding subscriber record with said at least one timestamped location;

receiving the outbound message for delivery to the subscriber;

determining, based on said at least one timestamped location and a site record for said current coverage area, at least one coverage area in which the subscriber is most likely located, to produce at least one anticipated coverage area;

calculating a difference between the present time and a previous registration time, to produce an elapsed time;

determining, based in part on said at least one timestamped location and said actual directional vector, a probable maximum time in which the subscriber would be outside at least said current coverage area:

comparing said probable maximum time with said elapsed time and delivering, responsive to the step of comparing, said outbound message to the subscriber.

5. A method in accordance with claim 4, further comprising the step of, at the central processor, updating at least a portion of the corresponding subscriber record with said actual directional vector.

6. A method in accordance with claim 4, further comprising the step of, at the central processor, calculating, based in part on at least two timestamped locations, an estimated directional vector, wherein said at least two timestamped locations include said at least one timestamped location.

7. A method in accordance with claim 6, further comprising the step of, at the central processor, updating at least a portion of the corresponding subscriber record with said estimated directional vector.

8. A method in accordance with claim 7, wherein said step of determining at least one probable delivery site further comprises the steps of:

calculating a difference between the present time and a previous registration time, to produce an elapsed time;

determining, based in part on said timestamped location and said estimated directional vector, a probable maximum time in which the subscriber would be outside at least said current coverage area; and comparing said probable maximum time with said elapsed time.

9. A method, for use by a subscriber in a networked radio communications system that serves a plurality of coverage areas, to reduce control channel traffic on the networked radio communications system, the plurality of coverage areas being serviced by a central processor, the method comprising the steps of:

determining a current location, within a current coverage area;

recording trend data for the subscriber to produce recorded trend data;

establishing, based at least in part on said current location and said recorded trend data, directional vectors to produce established directional vectors;

storing at least two of said established directional vectors to produce at least two stored directional vectors;

comparing said at least two stored directional vectors to detect a difference between said at least two stored directional vectors; and when the difference detected exceeds a predetermined threshold, sending an inbound message to the central processor, wherein said inbound message includes at least said current location.

10. A method in accordance with claim 9, wherein said step of establishing further comprises the step of determining current speed and direction of the subscriber.

11. A method in accordance with claim 9, wherein said step of establishing further comprises the step of using historical location data to calculate said directional vectors.

12. A method in accordance with claim 9, wherein said step of sending an inbound message further comprises the step of sending at least one of said directional vectors.

* * * * *